Figure 6:
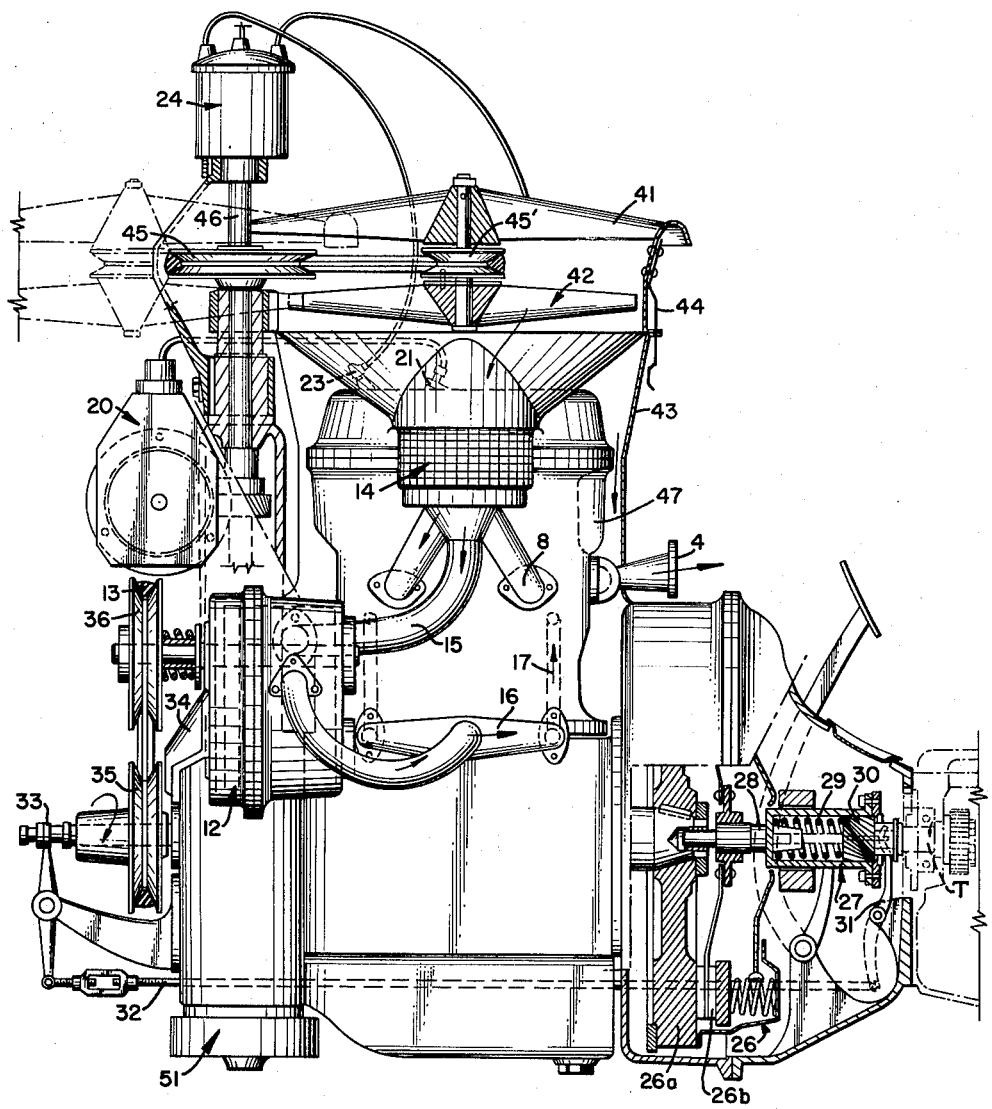

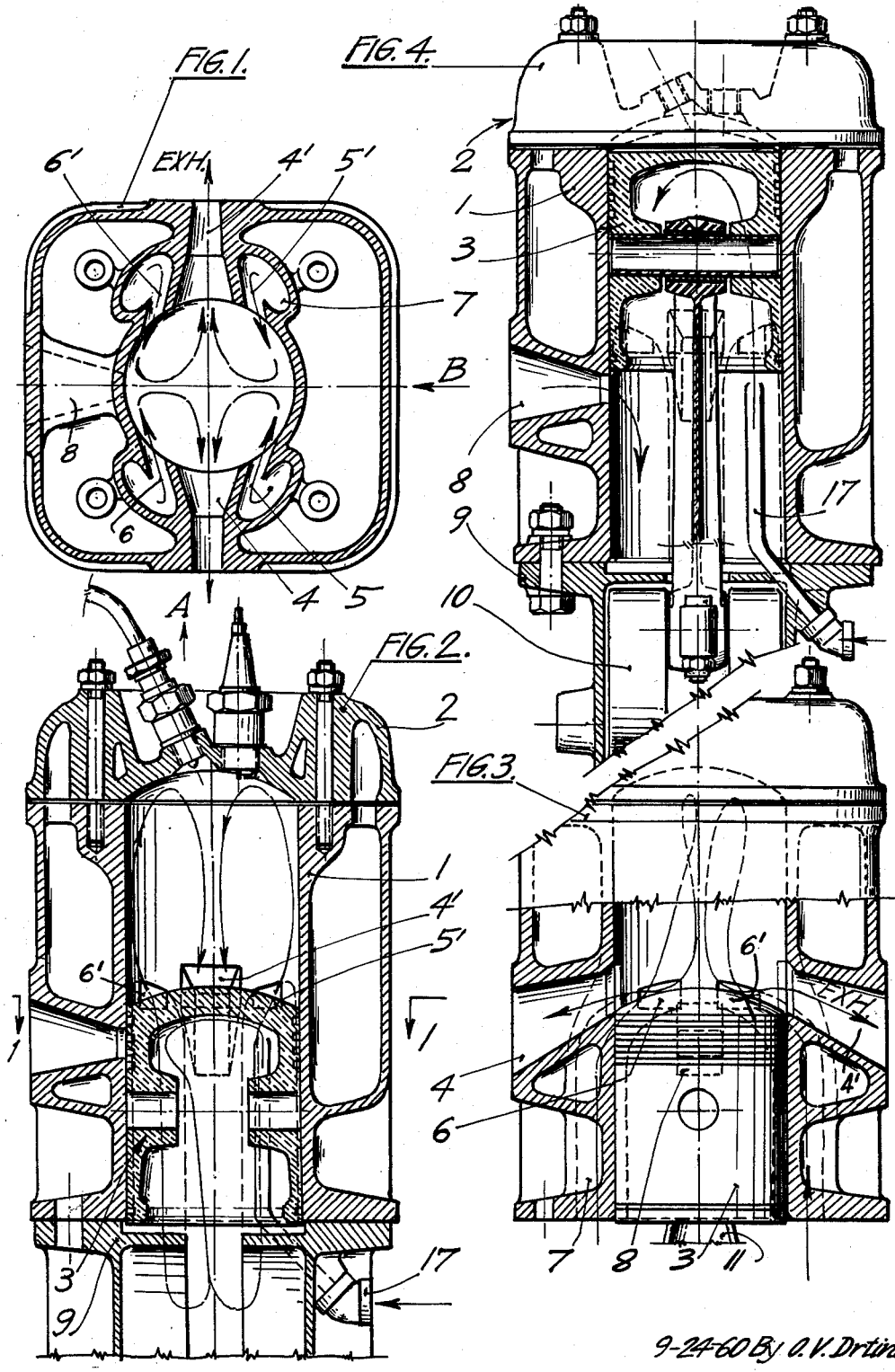

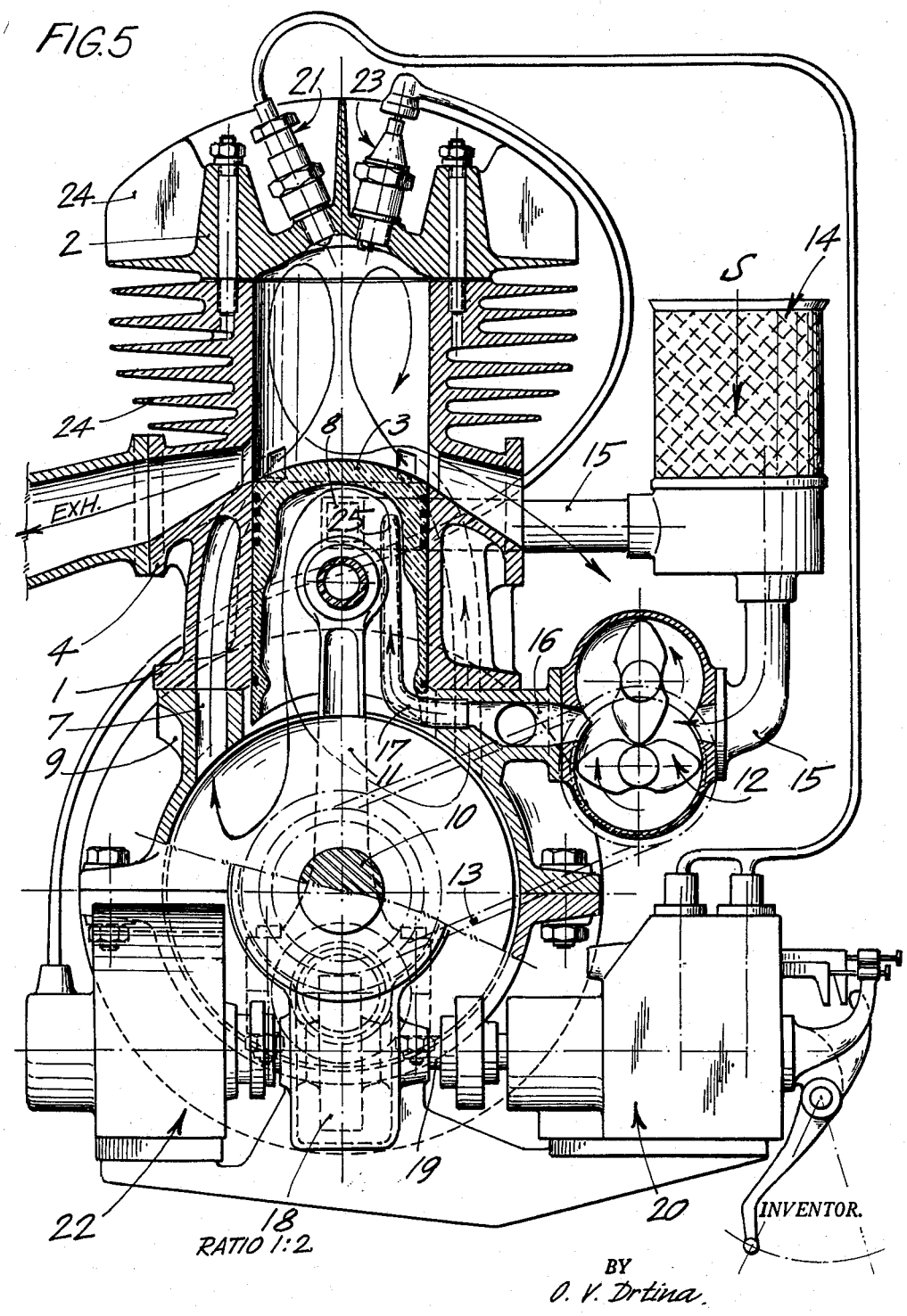

3,182,642
INTERNAL COMBUSTION ENGINE WITH ENFORCED DOUBLE-LOOP SCAVENGING AND OVERALL COOLING
Otto V. Drtina, Cleveland, Ohio
(1052 Kenneth Drive, Lakewood 7, Ohio)
Filed Oct. 20, 1961, Ser. No. 146,661
5 Claims. (Cl. 123—41.35)

This is a continuation in part of former S.N. 64,148 filed Oct. 21, 1960 for Double Loop Scavenging and S.N. 89,886 filed Feb. 16, 1961 for Inner Cooling of Pistons, both of which are now abandoned.

Present internal combustion engines of two-stroke per cycle principle, though they are developed to high level of perfection, still are not on the end of possibilities to increase the output per cubic displacement and their efficiency.

The biggest problems encountered in modern high-speed valveless two-cycle air-cooled engines are:

(a) An efficient scavenging and filling the space with most of fresh air,
(b) an effective piston-cooling from outside and inside and also an inner cooling of cylinder-walls and heads, and
(c) proper cooling of the cylinders with their heads and spark-plugs from outside.

Former point (a) is especially important in carburetor engines, where exhaust gases are driven out with mixture of air and fuel and any amount escaping during the scavenging would mean losses. In engines with gas-injection, spark ignited, the case is somewhat different since only exhaust gases and fresh air are handled during the scavenging, just as it is done in diesel engines. But it must be admitted, that even in diesels and in gas-injected engines, it is very important to get out all the residual exhaust gases and to fill the cylinder-space at most with fresh air and to cool off the walls, cylinder-heads and top of pistons including the piston-interior as much as possible, otherwise we could not get full efficiency of combustion from the available cubic displacement at higher speeds.

*Prior art.*—Since introduction of 2-cycle engines, engineers and researchers were trying hard to improve the first simple conception of valve-less two-cycle engine with familiar nose-partition arranged on top of piston.

There are ways suggested to improve scavenging with different, more or less complicated top-piston structures as for example in U.S.P. 994,696, and 1,744,446. For long it was realized that only smooth tops of pistons give best performance, as foolproof against formation of carbon residuals on same.

*Recent developments.*—There are of course good solutions at hand (for instance G.M.) with added exhaust valve to make the exchange truly uniflow, but all the original simplicity is thus gone; besides, there appeared new difficulties to overcome from vibrations caused by fast operating valves and their driving elements, due to twice as high speed as in 4-cycle engines (the valve has to open and close every revolution, while in 4-cycle engine only once in two revolutions).

Nevertheless, credit for new improvements in scavenging of valve-less two-cycle engines goes to Germans Schnürle, Venediger and List, who developed their fully acceptable loop and reverse scavenging (Umkehrspüllung). But there are still evident some deficiencies, mainly insufficient volume and pressure of scavenging air and consequently inadequate and uneven cooling off of the cylinder-walls with cylinder heads and inferior scavenging especially along the center line of the cylinder and inferior cooling of the top of piston. In ordinary loop-scavenging, the scavenging air follows a path along the walls and head and hardly hits the piston at all, as it is evident from recent German technical literature (for inst. in FIG. 23 on page 28 of "Deutche Kraftfahr-Forschung und Strassen Verkehrstechnik Heft 125—1959," or from U.S. Patents 1,169,891 and 2,477,374).

It is a well known fact, that if we go with compression to higher levels than presently used, higher economies and performances can be achieved, but more thorough scavenging and better cooling of pistons is a prerequisite.

Another well-known fact is, that two-cycle engines which are promising in many respects, cannot be much furtherly developed, until some means are found to cool off the pistons working under adverse conditions due to twice as many powerstrokes as in four-cycle engines per same speed.

Still another but less known fact is, that the interior of piston has all the time stagnant conditions, since there is no air-circulation whatsoever; no matter how fast the piston is moving, there is no exchange of air at all.

Also a fact is, that modern high-speed and high-compression engines need badly some kind of cooling of pistons to stop knocking, especially when using regular, low octane, fast-rate burning fuels, to prevent their decomposition (cracking). No matter if the engine is fitted with carburetor or gas-injected or of diesel type, the requirements are the same: more effective cooling of pistons is needed.

There has been made a real break-thru, when MAN of Germany developed internal cooling of pistons with spray of lubricating oil. The results were exciting; this new concept of controlling heat proved so efficient, that they obtained in diesels a very smooth run and smokeless combustion. There is but one serious drawback in this case and a real big one: it is very difficult to prevent oil from entering the combustion side of cylinder and to stop burning and wasting of same. They are trying hard to stop this ill effect, but so far, results obtained are not satisfactory as yet.

Before we proceed further, it is proper to note also most important objects of recent research and development relating to this art, i.e., ram-charging: It is a known phenomenon that in an internal combustion engine a wave is created, as the intake valve closes. Movement of the air is stopped abruptly, thus creating a pressure wave that is reflected from the closed end. The ram effect is primarily due to the inertia of the longer columns of the scavenging air or air-fuel mixture, and can be applied successfully to 2-cycle engines also, to improve the scavenging exchange.

Main object of this invention is to improve the scavenging exchange cycle, which is a sequence of operations to clean the cylinder of exhaust gases as best as possible and to fill-up same with fresh air of as much volume as possible, thru a combination of an integral scavenging pump formed by the underside of piston in fully enclosed crankcase and a separate compressor, all giving a volume in excess of piston displacement and of pressure of about 12 p.s.i.

Another main object of this invention is to provide an acceptably efficient inner-cooling of pistons with additional air, obtained from a separate blower, forcing said cooling air thru an elbow-nozzle extending into the piston-cavity to cool inside of same.

A sub-object is to cool off the cylinder walls more evenly thru four airstreams of a double-loop scavenging directed upwards to cylinder head, which means less cylinder-deformation due to heat and to bring all four streams of air from the cylinder-head down on the piston to cool it off and driving the exhaust gases straight thru two oppositely arranged exhaust ports out of the cylinder, leaving there no residuals.

Also a sub-object is to cool off the inner part of cylinder-head with said powerful stream of scavenging air to insure a lukewarm combustion chamber for a knock-free combustion and to prevent fuel cracking and so to enable the use of cheaper, low octane, regular fast burning fuels.

Still another sub-object is to provide more even and symmetrical cooling of the piston-top thru those four streams directed straight down on the head, resulting in better cooling and less heat-deformation of the piston.

Another object of inner piston-cooling is to provide conditions favourable to use higher compression ratios for better thermal efficiency of combustion.

Still another object of inner piston cooling is to be able to use higher engine speeds in 2-cycle engines with aircooling of cylinders without overheating same.

Thru inner and outer thorough engine-cooling obtained "no knock" lukewarm combustion, there must not be used Tetra-Ethyl-Lead antiknock fuels any more, and so we eliminate trouble with scale-bridging in spark-plugs, so common on 2-cycle spark-ignition engines.

Also an object is in case of a 2-cycle engine with scavenging pump integral with the crankcase and with an additional blower or pump for this novel piston-cooling, where said air is afterwards reused for scavenging, which combination provides the scavenging operation with badly needed excess of air. The scavenging pump formed by the underside of piston reciprocating in same cylinder, using an enclosed crankcase as recipient, has one disadvantage: low volumetric efficiency due to piston-cavity, moving connecting rod dead space and various other dead pockets; we cannot increase the output of such scavenging pump because it has same diameter of piston and same stroke and same speed as the engine has. In order to be able to fulfill a requirement to render scavenging with volumetric excess of air, the reuse of inner-cooling air in addition to above, is the best way.

An object of the latest development is a variable drive of the booster blower driven from the engine and actuated from a torque-sensing device arranged on the clutch-shaft to increase the volume of cooling and scavenging air proportionally with higher load transmitted.

In order to provide best suitable engine-cooling, there is also an object of this invention in an improved air-cooling of the engine from outside, acting directly onto the cylinder-head, which unit is retractable for the purpose of servicing the spark-plugs and injection nozzles. This arrangement enables also to direct a part of blown-in air into the inlet air filter and suction manifold to pressurize same slightly to increase the output of both the scavenging pump and the Roots blower, as a result of ram-charging effect.

An unsolved problem of 2-cycle engines with integral scavenging pump formed by the piston in same cylinder in fully enclosed crankcase, is the satisfactory lubrication of the engine.

Two-cycle engines presently used have mostly gas-oil mixture lubrication, newer ones have oil injected into suction manifold; both principles have one main drawback which mainly rests in oil-mist settling down on spark-plugs, forming thus scale thereon and causing troublesome bridging on electrodes, preventing proper firing, showing first in difficult starting and poor combustion; when bridging grows excessively, there is no starting possible at all.

It is well known that 4-cycle engines using splash oil-pressure circulating lubrication confined to crankcase only, do not have this difficulty. Application of this lubrication principle properly modified to 2-cycle engines as defined above, is another object of this invention, which will be handled separately.

*Drawings.*—In order to be able to explain fully the embodiment of my invention, drawings are attached where are clearly shown the various ports and passages and in arrows the oriented scavenging streams; so FIG. 1 shows the cross-section 1—1 in plan view;

FIG. 2 is the front view seen in direction of arrow A shown in section along the center line with piston down, and FIG. 3 is a side elevation seen in direction of arrow B with bottom part in section along the center line but with the piston body in full view.

Additional FIG. 4 shows the front view as in FIG. 2, but with piston in top dead center, so the passage of fresh air into otherwise fully enclosed crankcase is clearly seen.

FIG. 5 on sheet #2 shows an application of inner cooling of piston to a two-stroke per cycle aircooled engine double-loop scavenged and equipped with fuel injection.

FIG. 6 shows torque-sensing device arranged on a 2-cylinder, 2-cycle aircooled engine to be used for varying the amount of scavenging air proportionally to torque transmitted; also a new type of direct-flow air-cooling of cylinder-heads is there shown.

In order to improve the previously noted deficiencies of existing 2-cycle engines in respect to unsufficient scavenging-air exchange and inadequate piston-cooling, a combination of an integral crankcase scavenging pump (furnishing the primary air) and a booster blower (to produce additional secondary air) is here outlined and described, which combination provides the badly needed excess-volume of scavenging air as compared with the volume of piston displacement.

First, a new concept of scavenging exchange used and described in this invention, is to be clarified: The top cooling fan provides a slightly pressurized condition in the intake air filter. Referring to FIG. 4, the primary air drawn from said filter enters into crankcase thru the crankcase inlet port 8, exposed by the bottom edge of piston, when in top dead center; from same source, an additional air enters into rotary blower as shown in FIG. 5 and is blown as secondary air thru an elbow-nozzle 17 into the piston-cavity to cool same off. Both primary and secondary air are precompressed by the scavenging pump and at proper interval led thru four pass-over channels 7 of FIG. 5 into cylinder-space to drive out fully all exhaust gases and to fill-up same completely with clean air.

In describing the basic scavenging-ports arrangement which is put down in attached drawings 1 to 4, where only one cylinder is shown for the sake of clarity, 1 is the cylinder-body in which piston 3 is moving up and down, actuated by any means as is the customary crankshaft 10 and connecting rod shown in FIG. 4. The top of cylinder is tightly closed by a cylinder-head 2, with upwardly curved combustion space, in which an injection nozzle and a spark-plug are screwed tightly in, in positions, ensuring best ignition and combustion.

The cylinder 1 is provided with two rectangular exhaust openings 4–4' arranged oppositely with bottom edges flush with the top edge of piston 3, when same is in lowermost position. These exhaust ports are pitched down to outer flange of the cylinder block, to let the exhaust gases to continue out in uniflow stream.

Adjacent to those exhaust ports are the scavenging-air inlet openings (ports) 5 and 6 and 5' and 6' arranged symmetrically on each side of each exhaust port 4 and 4'; these inlet ports, however smaller, have also their bottoms flush with the top edge of piston when same is down. Said couples of inlet ports are directed outwardly from each central exhaust port under an acute angle and upwardly; each set of two opposite inlet ports is arranged under an obtuse angle as seen in FIG. 1, so two together coming streams from these opposite ports meet on the wall in the middle of way between said openings. The scavenging air inlet ports 5–5' and the opposite ones 6–6' are of rectangular form with slanted top, inclined symmetrically up to center to enable the inrushing scavenging air to be directed upwards and toward the wall.

Four vertical pass-over passages 7 are of oval form and connect the scavenging-air inlet ports (located in cylinder-wall) with the crankcase 9.

There is one more crankcase inlet port 8 arranged in cylinder, to enable fresh air to enter the crankcase when the piston 3 comes to its uppermost position and exposes said port with its bottom edge, as shown in FIG. 4.

FIG. 5 shows an air-cooled two-stroke high speed internal combustion engine and for simplicity reason, is again shown as a one-cylinder engine with a double-loop scavenging as described before. The crankcase 9 is air-tight and is used for precompression of scavenging air by the underside of piston; said scavenging air enters normally the crankcase thru inlet port 8, when exposed for a very short period of time by the bottom edge of piston 3. The scavenging air is filtered from impurities before it enters the engine thru the intake air filter 14. The cylinder 1 and the head 2 are air-cooled from outside thru fins 24. The cooling effect can be increased by adoption of a cooling fan (blowing the air in volume of about 10 cubic feet per minute, per horsepower) shortest way, right over the heads and along the cylinder-walls to get best efficient direct cooling. Said fan-unit as shown in FIG. 6 is retractable even when running, so the sparkplugs, cables and injection nozzles can be checked in operation easily.

In order to provide an effective inner cooling of piston, a blower 12 (FIG. 5) is arranged on the engine, driven directly from the crankshaft 10, which suction side 15 is connected to already mentioned air-filter 14; the exhaust port 16 is flanged directly to crankcase right under the cylinder-flange and an elbow-nozzle 17 is directed upright under the piston 3, so it would not strike it when same is in the bottom dead position.

For completeness, since here is shown a gas injection engine, there is a spark-plug 23 provided in head together with gas injection nozzle 21. This injection nozzle is supplied from a fuel injection pump-unit 20 and the spark-plug provided by a magneto 22 or a distributor, when battery is available; both are arranged on an auxiliary shaft 19, driven from the crankshaft at half of its speed.

An improved hybrid injection system is here used to provide nonsputtering run at low speeds and a foolproof run at all high speeds; also a variable supercharging can be incorporated, acting accordingly to load transmitted, all of which is described in separate patent application S.N. 160,407 of Dec. 13, 1961, now abandoned.

The whole assembly works as follows: As shown in FIG. 4, let us assume that the piston is in its uppermost position and the previous stroke produced the filling of cylinder with air, fuel injection and mixture compression, and the charge was ignited; simultaneously fresh air was sucked-in under the piston thru port 8, when exposed. After the combustion stroke brought the piston almost to its bottom position as shown in FIGS. 2, 3 and 5 then the exhaust gases escape freely thru the exposed bottom opposite exhaust ports 4–4' into the open, thru some muffler. Shortly afterwards, before the bottom dead position of piston, the air furnished by nozzle 17 and the air sucked-in thru port 8 which was in the meantime precompressed in the air-tight crankcase as being in excess of piston displacement, rush powerfuly into the cylinder thru pass-over passages 7 and four scavenging air inlet ports 5–5' and 6–6' when at proper time exposed.

*Double-loop scavenging.*—Two streams (left 5 and right 5') and two streams (left 6 and right 6') of scavenging air as shown in FIG. 1 in direction of B, meet on their way up along the wall of cylinder, reach the inner space of the cylinder-head 2 and then thru its concave curvature they turn back to centerline of cylinder and down, and while both couples of streams meet as they go down the cylinder, they strike the full area of piston, after which, shortly before the bottom position of piston, said streams split in two and enter the exhaust ports 4–4'. As evident, the cooling is much more evenly distributed to the walls and head and to full area of the piston-top just as well, cooling off same and besides all residual exhaust gases are driven out without leaving any pockets therein, resulting in better overall efficiency of combustion. Shortly after all the ports are covered by an upward-moving piston, the injection of fuel usually takes place.

While a thorough cooling of top of piston was already fully described, it remains to explain an additional inner cooling of same as an important factor to obtain trouble-free run on modern high-speed 2-cycle engines. While the booster blower 12 shown in FIG. 5 and driven from the engine, say by a V-belt 13 or directly, delivers a continuous flow of compressed air to about 12 p.s.i., working in addition to the scavenging system of insufficient volumetric output as explained on page 4, it is obvious that scavenging-air volume is boosted-up considerably, what is a definite advantage in this arrangement of engine. When the piston goes up, it provides a partial vacuum in the crankcase, till the port 8 is exposed; then the outer air rushes in and fills the space. On way down of the piston 3, the air is gradually precompressed on the scavenging-pump side; besides, an additional blower is supplying constant amount of air thru the elbow-nozzle 17, right under the piston. The cooling-off stream is strongest before the top dead position of piston (due to partial vacuum) and then once more again when the piston is in the bottom dead position, exposing the pass-over ducts into the cylinder, at which point the pressure drops down as scavenging air attains high velocity. At this moment the velocity in the elbow-nozzle 17 increases into a powerful stream of cooling air which blows directly into the piston-cavity as it is closest to the nozzle, driving out the stagnant hot air prevailing there and filling consequently the whole piston-interior with fresh air and providing so an efficient additional cooling of piston, to prevent knocking, so higher compression ratios can be used to obtain higher combustion efficiency and to be able to run engines at higher speeds.

Device for varying the amount of scavenging air proportionally to torque transmitted (FIG. 6):

In German research periodical treatise: "Das Betriebsverhalten des Schnell-laufenden Zweitakt-Ottomotors mit Einspritzung under seine Entwicklungsmoeglichkeiten" by Doc. Dr. Ing. K. Groth, 1959—Heft 125, pp. 12 and 13, there are three basic sentences put down regarding the scavenging of 2-cycle engines:

(1) Pressure and efficiency go up 5 to 7% when the scavenging-air volume is boosted from 0.7 to 1.1; over 1.3 they go up only a little.
(2) Inner fuel consumption is improved 5.9 to 10.6% when the volume of scavenging air is varied from 0.7 to 1.5.
(3) The efficiency with high amount of scavenging air is good only at higher loads.

Those findings indicate clear way to take for further improvement of 2-cycle engines, namely to increase the scavenging-air volume with the increasing load to obtain the above mentioned results.

As noted in above said treatise, the volume of scavenging air provided is to be had of 1.1 to 1.5 times more volume than is the cylinder's cubic displacement, to obtain best results; also the pressure of same plays an important role and may be compressed up to 12 p.s.i.

There could be set following general formula for practical applications: A combination of scavenging pump arrangement without variable drive of the booster-compressor should provide 1.3 excess of scavenging air; a combination with variable drive of the booster compressor should have a variation of scavenging-air volume from 1.1 to 1.5 proportionally to torque and speed.

In FIG. 6, there is shown a 2-cycle 2-cylinder crank-case scavenged engine with gas-injection and an additional booster-pump driven thru a variable drive to provide needed air for piston-cooling and additional air for scavenging. Same drawing shows an efficient air-cooling of head and walls from outside as an integral part of the job.

In describing same, a standard Roots blower 12, of a positive displacement type is here used for the inner-cooling of pistons with 12 p.s.i. precompressed air thru nozzles 17, and to boost-up the air-volume for scavenging.

It is comprising a cast iron housing, having inlet and outlet nozzles and accurately machined inside compartment to accommodate two intermeshing shaft-mounted elements (impellers), each having 2 or 3 lobes, wherein the driving element has extended shaft to serve as a drive shaft of the unit. Said impellers (resembling spur gear pinions) are enclosed in said compartments (but free to rotate), and the whole assembly is further having a spur-gear drive secured to each shaft to ensure proper mesh of lobes and is fully enclosed for proper lubrication of same.

Said blower is mounted parallel on the engine-side thru a bracket 34, and is driven thru a common variable V-belt drive, consisting basically of sheaves 35 and 36 and a V-belt 13. The variation-affecting member 35 on the input side, with two companion discs tapered slightly to fit sides of V-belt, has one disc secured to crankshaft, the other disc axially movable against the rigid one thru a stud actuated by lever 33 from torque-sensor to cause the variation as is described hereafter. The speed-variating member 36 on the output side (with discs similarly shaped as previous ones) has one disc rigidly mounted on blower drive shaft, the other disc axially movable and both kept together by a coil spring, to keep the V-belt 13 (which transmits torque from one member to the other) squeezed between said discs. It is noted, that other types of variable drives could be used just as well, to provide the needed speed-variation of the booster-blower.

The torque-sensor is acting on such a principle that two rotatably arranged elements with integral helical gearing, one element driving, the other driven, one male and one female screwed together, one of which is axially secure, the other axially movable, spaced by some resilient means like a coil-spring capable of transmitting the resulting thrust-force from transmitted torque causing certain axial displacement of the movable element, which is used to operate the variable drive of the blower.

In the flywheel-clutch unit 26, instead of standard splined clutch shaft, there is a torque-sensing unit 27 arranged normal way with one side located in the crankshaft sleeve, while the other end is mounted in bearing of the transmission on housing, as shown in phantom lines, the torque-sensor is provided with a helical internal gearing having 45° helix angle, into which engages freely a shaft 30 with integral helical gear with identical helix angle of the transmission input shaft. Spring 29 keeps the splined clutch shaft 28 in right-hand position and only the resultant thrust from transmitted torque tends it to move to left and to actuate the lever 31 with its flanged end.

The torque sensor works as follows: Considering a helical gear 30 with 45° helix angle and an inner helical gear 28 of same helix angle meshing into above and some torque applied to, then the tangential force of said torque, acting on pitch circle of gear, transmits same torque to the driven element, but thru the angle of helix the inner helical gear has a tendency to screw-in as much as the inserted spring 29 allows. This side-movement, however small, is then used to actuate the variable drive actuating lever 31.

The drive is set-up thru a turnbuckle on rod 32, so that, when the engine is idling, the blower is making-up a total volume of scavenging air equal to 1.1 multiple of piston's cubic displacement. Proportionally to torque transmitted, the amount of scavenging air is increased to 1.5 excess. It is evident, that with increased torque T transmitted (not the one developed by the engine) there is produced a proportional thrust-force Tf as the part 28 has the tendency to screw itself over the gear of shaft 30, which axial movement is then transmitted thru a lever 31 and rod 32 to another lever 33 arranged on the V-belt drive side, which is actuating the variable drive in such a manner, that with increased torque, the blower rotates faster and delivers more air and vice versa.

Engine cooling and air-filter charging: Air-cooling of larger two-cycle internal combustion engines was always a difficult task; however it is a trifle easier on diesel engines, but up to present time there are only a few diesel engines of 2-cycle principle over 25 H.P. in size, which are operating successfully with air-cooling; therefore an object of this work is to improve the engine-cooling also. It was realized that most effective cooling is obtained by a direct blow (without diverting elbows, causing unneeded friction and loss of velocity) and the hottest areas (engine-head) should be attacked first. Therefore the cooling fan 42 is placed in quite an unusual position above the engine and is arranged with its impeller-axis in vertical position to blow the air directly and efficiently over the engine-head down and along the finned cylinder walls and into otherwise standard intake air-filter 14, located on side of engine, in line of cooling air flow, inside of cover 43 and connected thru piping 15 to the suction side of the blower 12, and thru branches to the scavenging air inlet nozzles 8; this air-filter is an ordinary outfit with a cartridge filled with oil-soaked coarse steel wool and has an air-inlet arranged from top, so part of the blown-in cooling air is forced thru this air-filter into said suction passages 8 and into suction manifold 15 of the blower 12 creating there slight pressure at that point for the purpose of increasing the volume of scavenging air and so to improve the volumetric efficiency of the scavenging air exchange. In the old fashioned arrangements, the air needed for combustion had to be sucked-in thru the filter resistance, which (depending on how clean it was) affected very much the volume of sucked-in air.

In front of engine, there is arranged in slim housing a vertical shaft 46 called usually a "king shaft" driven from the crankshaft thru pair of bevel gears; it is needed to drive various auxiliaries as are the injection pump 20, distributor 24, generator (not shown) and the cooling-fan 42.

The fan-unit 42 is set right above the cylinders in a swinging housing 41 pivoted around said king shaft 46 in a journal located right under the driving pulley 45, and secured in working position by a latch 44, engaging the top flange of stationary housing 43. On top of housing 41, there is a concentrical damper-vane deflector with its central hub made to hold on its vertical pin the fan-impeller unit 42, with the V-belt pulley 45'.

Underneath the propeller, there is arranged a stationary housing 43 which fits closely the fan-opening and directs blown air toward the head and along the cylinder-walls, which are provided with heat-transfer fins 47. The fan itself is driven by a V-belt drive over pulleys 45–45'. It is sometimes needed (while engine is in operation) to check the spark-plugs with their cables or the injection nozzles with the connecting piping; it is evident, that with this arrangement the above check is easy to accomplish safely when the whole fan-housing 41 is swung to side as indicated in phantom lines on left side of FIG. 6, even when the fan is running. It is noted that with this arrangement the correct V-belt tension isn't affected, when the fan-unit is swung out.

These improvements as heretofore described can be used individually or all together on any 2-cycle valve-less engine with integral scavenging pump created by the underside of piston working against fully enclosed crankcase: in a carburetor type (spark ignited), in a gas-injected type (spark ignited) and in a high-compression (self ignition) engine (diesel).

So far, simplest arrangements were shown and described, which can be readily applied to any multiple-cylinder engine of any arrangement of cylinders.

I claim:

1. In an internal combustion engine of a 2-stroke per cycle principle, a combination of a scavenging pump provided by the underside of the engine-piston itself cooperating with a sealed crankcase, said scavenging pump receiving its air from a pressurized inlet air-filter and thru a crankcase inlet port exposed by the bottom edge of the reciprocating piston when it reaches top dead position, and an additional booster-blower driven from the engine and receiving its air from same inlet air filter, with a nozzle directed upwardly toward the underside of the engine piston and a connection from booster-blower to the nozzle to supplement unsufficient volume of scavenging air delivered by the crankcase scavenging pump to the cylinder's scavenging air inlet ports thru pass-over passages, this combination to provide together up to 1½ times more volume of scavenging air than is the cylinder's cubic displacement and precompressed to at least 12 p.s.i. before entering the cylinder space, to improve the efficiency of the scavenging exchange and to cool off the piston.

2. In a combination as claimed in 1, four pass-over passages interconnecting the crankcase with cylinder scavenging air inlet ports and made operative by a reciprocating piston, enabling double-loop scavenging with excess of scavenging air through a couple of exhaust ports oppositely arranged in lower part of cylinder enabling the exhaust gases to escape in two opposite streams, and a couple of scavenging air inlet ports arranged adjacent and symmetrically to each exhaust port and directed outward, enabling the inrushing air to enter the cylinder in two couples of up-going streams heading each against the other and making a loop around the concavely curved inner space of the cylinder-head and continuing down along the axis of the cylinder, striking the top of piston and proceeding into exhaust ports, thus driving out all residual gases and filling the cylinder space fully with fresh air and simultaneously cooling off the combustion space including the reciprocating piston.

3. In a combination as claimed in 1, said booster-blower located in the front and on the side of the engine and secured through a bracket to the body of same, having its drive shaft parallel to the engine crankshaft and driven from same through a variable drive located between the front-end of the crankshaft and the blower-drive shaft, which vari-drive comprises one driving member driven from the engine-crankshaft and another member (affecting speed-variation) to turn the booster-blower, means for transmitting rotation-force from one member to the other in variable manner, and means to actuate said variable drive to affect speed-variation, to drive the booster-blower correspondingly slower and faster in relation to speed of the engine, thus enabling a variation in volume of delivered scavenging air, equaling the cylinder's cubic displacement multiplied by 1.1 at minimum and by 1.5 at maximum.

4. In a variable drive used to slow-down and speed-up the booster-blower as claimed in 3, wherein said vari-drive is actuated from a torque-sensor, located in clutch housing on engine output shaft and driven from same, having: an axially movable clutch spline shaft with integral inner helical gearing in its tubular extension, a spacer spring inserted in the tubular extension of clutch spline shaft to take-up the developed thrust from transmitted torque, and a driven helical gear element of the transmission input shaft engaging said inner helical gear, which is having tendency to screw-in under load, wherein one element is axially secured, the other axially movable in proportion to torque, which movement is transmitted to blower, to actuate its variable drive in direct proportion to torque transmitted.

5. In an air-cooled internal combustion engine of a 2-stroke per cycle principle, an engine-cooling fan with its vertical turning axis arranged above the engine to blow cooling air directly onto hottest areas of the cylinder head, along the cylinder walls and into the standard intake air filter; the fan unit consisting of a vane-deflector arranged in a swinging way on a stationary journal in the center-line of a vertical king-shaft, for the purpose of servicing the spark-plugs, with the impeller located adjacent and centrally with said vane deflector and driven from the king-shaft thru a V-belt drive, and an intake air filter to furnish all the needed clean air for the scavenging exchange, located on the side of engine in line of the air-stream of the engine cooling fan in ducting arranged underneath of same, said filter having its inlet opening on top, enabling the blown-in air to pressurize the whole filter-space in order to provide more of same to the scavenging pump system.

References Cited by the Examiner
UNITED STATES PATENTS

| | | | |
|---|---|---|---|
| 2,434,348 | 1/48 | Brown | 123—73 |
| 2,547,327 | 4/51 | King | 123—73 |
| 2,840,062 | 6/58 | Classen | 123—65 |
| 2,989,042 | 6/61 | Kloss | 123—41.65 |

RICHARD B. WILKINSON, *Primary Examiner.*